United States Patent
Wallenius

(10) Patent No.: US 7,535,824 B2
(45) Date of Patent: May 19, 2009

(54) BINARY CLASS BASED CONTROL

(75) Inventor: Eero Wallenius, Kangasala (FI)

(73) Assignee: Nokia Siemens Networks Oy, Espoo (FI)

( * ) Notice: Subject to any disclaimer, the term of this patent is extended or adjusted under 35 U.S.C. 154(b) by 728 days.

(21) Appl. No.: 11/189,219

(22) Filed: Jul. 25, 2005

(65) Prior Publication Data

US 2007/0008879 A1 Jan. 11, 2007

(30) Foreign Application Priority Data

Jun. 13, 2005 (FI) .................................. 20050625

(51) Int. Cl.
H04J 1/16 (2006.01)

(52) U.S. Cl. ...................................................... 370/216

(58) Field of Classification Search .................. None
See application file for complete search history.

(56) References Cited

U.S. PATENT DOCUMENTS

| 7,142,820 B1 * | 11/2006 | Rajala | 455/67.7 |
| 2006/0153083 A1 | 7/2006 | Wallenius | 370/241 |

FOREIGN PATENT DOCUMENTS

| EP | 1 322 064 A2 | 6/2003 |
| GB | 2 292 872 A | 3/1996 |
| WO | WO 99/20034 | 4/1999 |

OTHER PUBLICATIONS

Alanen et al, Performance Management in 3/4G Mobile Networks, IEEE, 5 pages, 2005.*

* cited by examiner

Primary Examiner—Frank Duong
(74) Attorney, Agent, or Firm—Harrington & Smith, PC

(57) ABSTRACT

The invention allows binary class based control of a communications network and its services. A fault table and a state table are generated. The state table is compared with the state table in response to detecting a change in a state table entry. If the changed state table entry equals a corresponding fault table entry, an appropriate control action is determined and performed. The invention allows controlling a communications network, communications network resources, communications network services and services provided over the communications network significantly faster than prior art implementations.

7 Claims, 4 Drawing Sheets

State Table

| BTS | SGSN | GGSN | |
|---|---|---|---|
| 01 | 11 | 10 | delay |
| 0000 | 0100 | 1111 | number of dropped calls |
| 000 | 110 | 001 | throughput of connection A |

Fault Table

| BTS | SGSN | GGSN | |
|---|---|---|---|
| 11 | 11 | 11 | delay |
| 1111 | 1111 | 1111 | number of dropped calls |
| 000 | 000 | 000 | throughput of connection A |

BINARY CLASS BASED CONTROL

BACKGROUND OF THE INVENTION

1. Field of the Invention

The invention relates to communication networks. In particular, the invention relates to controlling a communications network and its services in a novel and improved way.

2. Description of the Related Art

Today communications networks, such as mobile telecommunications networks, typically comprise a large number of various network elements including base stations, switching centers, various gateways etc. Typically a large communications network may comprise tens of thousands of network elements. And still the networks continue to grow as more and more services are developed.

To control or manage these large and complex networks, there have been developed network management systems in which network management information is collected. The information is typically received from Operation and Maintenance (O&M) units internal or external to a network element, or by probing with an external monitoring tool. Typically the collected information can be presented to network management personnel or operators in various ways to facilitate an operator to make informed management decisions. Typically the collected information is numerical and it is also presented in a numerical form. That is, e.g. a measured piece of numerical performance data is typically presented to the network management personnel as is.

Typically a network management system comprises fault management and performance management. Fault management involves monitoring notifications and alarms generated by various network elements, O&M units and the network management system itself, indicating status changes and detected faults, evaluating their importance and effects, and initiating actions, like repairs. Performance management, on the other hand, involves collecting performance measurements from various network elements, O&M units etc. to the network management system, and subsequently analyzing the collected data. Thus e.g. trends and problems in the network can be detected. However, in a typical prior art system fault management and performance management are separate from each other, and thus e.g. root cause analysis typically cannot be satisfactorily performed.

The collected performance measurements typically relate to parameters which can be used to indicate the performance of the network or a network element, or a service provided by the network. Such parameters are also referred to as performance indicators in the art. Examples of performance indicators include number of call attempts, number of blocked calls, number of dropped calls, handover failure rates, delay associated with a given connection, and throughput associated with a given connection, as well as measurements like memory usage, CPU usage, process status etc. The performance measurements are typically transmitted to the network management system sequentially, e.g. every 15, 30 or 60 minutes or every 12 or 24 hours, depending on the network, e.g. the network size, the amount of different kind of measurements to be collected, and the capacity of the network management system. Having received the collected performance measurements, the network management system analyzes them. Typically the analysis is performed by batch processing in which the received data is analyzed e.g. once every 24 hours.

Current implementations typically use e.g. various algorithm based methods for the analysis. A performance indicator has a range of values associated with it. Based on measurements collected over a relatively long time, a normal value or sub-range of values for a given performance indicator may be determined. Correspondingly, based on recently collected measurements, a current value for the same performance indicator may be determined. Thus, it may be determined for example, whether the current value deviates from the normal value enough for an operator to look into the matter.

Prior art also includes patent application WO 99/20034 of Rajala, Antti, filed Oct. 13, 1998, which is commonly assigned with the present application. The disclosure of this application is incorporated by reference herein. WO 99/20034 relates to monitoring and maintaining a network in telecommunications networks which comprise a large number of network elements. The network elements are presented as a hierarchical diagram or as a map display on a graphical user interface. The graphical user interface presents performance information of the network element as a graphical presentation in connection with the network element symbol in such a way that the operator can, at one glance, identify the network elements that are the most important in terms of the operation of the network or the network elements most affected by faults. The measurement results are post processed by a network management system when they are received, e.g. every 15, 30 or 60 minutes. Thus, WO 99/20034 fails to disclose a real time system. In addition, monitoring and maintaining as disclosed by WO 99/20034 requires a vast amount of calculation capacity and database capacity.

Prior art also includes Finnish patent application FI-20050017 of Wallenius, filed Jan. 7, 2005, which is commonly assigned with the present application. The disclosure of this application is incorporated by reference herein. An application claiming priority of FI-20050017 has also been filed in the United States of America on Apr. 22, 2005. FI-20050017 relates to binary class based analyzing and monitoring for a communications network and its services. However, FI-20050017 fails to disclose control or management of a communications network or its services.

As current networks continue to grow exponentially, there is more and more need for faster network management including control of network resources, network services and services provided over the network. In particular, prior art control of the network resources, network services and services provided over the network lacks performance when the networks are large. Firstly, the current implementations typically perform the analysis as an off-line procedure, for example once every 24 hours. In other words, the analysis is not performed in real-time which may seriously degrade the performance of the network or the quality of service since performance problems may remain unattended to until the next batch processing of collected performance measurements. Furthermore, the present algorithm based analysis methods do not allow real-time control decisions to be made either. Typically, current algorithm based methods use 1,000-10,000 CPU cycles to calculate a specific response. And further, the current implementations do not allow real root cause analysis due to separate fault management and performance management, and due to a vast amount of calculation capacity required from such an analysis system when implemented on top of current implementations.

Therefore, the object of the present invention is to alleviate the problems described above and to introduce a solution that allows controlling a communications network, communications network resources, communications network services and services provided over the communications network significantly faster than previously, even in real-time.

SUMMARY OF THE INVENTION

A first aspect of the present invention is a method of controlling a communications network. At least one fault table is generated. The at least one fault table comprises fault entries. Each fault entry comprises a binary fault code. Each binary fault code indicates a fault associated value range class of one of multiple indicators. Each of the indicators is associated with at least one of the communications network resource, the communications network service, and the service provided over the communications network. The communications network may be a wireless network, wired network, or a combination thereof. Each of the indicators has a value range. The value range of each indicator is divided into value range classes. At least one value range class of at least one indicator may be associated with a fault in at least one of the communications network resource, the service provided over the communications network, and the communications network service related to the at least one indicator. Such a value range class is herein referred to as a 'fault associated value range class'. Furthermore, when the value range of each indicator is divided into the value range classes, a binary code is assigned to each value range class. A binary code assigned to a 'fault associated value range class' is herein referred to as a 'binary fault code'.

A state table is generated. The state table comprises state entries. Each state entry comprises a binary state code. Each binary state code indicates a value range class of a piece of collected data related to one of the indicators. That is, pieces of data are collected, each piece of the data related to one of the indicators. Each collected piece of the data is within one of the value range classes of the related indicator. A binary code assigned to a value range class which a collected piece of data is within, is herein referred to as a 'binary state code'.

A change is detected in at least one of the state entries. The state table is compared with the at least one fault table to determine whether the at least one changed state entry equals at least one corresponding fault entry.

If the at least one changed state entry equals the at least one corresponding fault entry, at least one control action associated with the at least one corresponding fault entry is determined, and the determined at least one control action is performed.

A second aspect of the present invention is a system of controlling a communications network. The system comprises at least one fault table comprising fault entries. Each fault entry comprises a binary fault code. Each binary fault code indicates a fault associated value range class of one of multiple indicators, each of which indicators is associated with at least one of a communications network resource, a communications network service, and a service provided over a communications network.

The system further comprises a state table comprising state entries. Each state entry comprises a binary state code. Each binary state code indicates a value range class of a piece of collected data related to one of the multiple indicators.

The system further comprises a change detector arranged to detect a change in at least one of the state entries. The system further comprises a comparator arranged to compare the state table with the at least one fault table to determine whether the at least one changed state entry equals at least one corresponding fault entry.

The system further comprises a control action determinator arranged to determine at least one control action associated with the at least one corresponding fault entry equaling the at least one changed state entry. The system further comprises a controller arranged to perform the at least one determined control action.

A third aspect of the present invention is a control action device. The control action device comprises a comparator arranged to compare a state table with at least one fault table to determine whether at least one changed state entry comprised in the state table equals at least one corresponding fault entry of fault entries comprised in at least one fault table, each state entry comprising a binary state code, each binary state code indicating a value range class of a piece of collected data related to one of multiple indicators, each indicator associated with at least one of a communications network resource, a communications network service, and a service provided over a communications network, and each fault entry comprising a binary fault code, and each binary fault code indicating a fault associated value range class of one of the multiple indicators.

The control action device further comprises a control action determinator arranged to determine at least one control action associated with the at least one corresponding fault entry equaling the at least one changed state entry.

A fourth aspect of the present invention is a computer program embodied on a computer readable medium for controlling a communications network. The computer program controls a data-processing device to perform the steps of:

detecting a change in at least one of state entries comprised in a state table, each state entry comprising a binary state code, each binary state code indicating a value range class of a piece of collected data related to one of multiple indicators, each indicator associated with at least one of a communications network resource, a communications network service, and a service provided over a communications network, comparing the state table with at least one fault table to determine whether the at least one changed state entry equals at least one corresponding fault entry of fault entries comprised in at least one fault table, each fault entry comprising a binary fault code, each binary fault code indicating a fault associated value range class of one of the multiple indicators, and determining, if the at least one changed state entry equals the at least one corresponding fault entry, at least one control action associated with the at least one corresponding fault entry.

A "computer readable medium" may include any of the physical memory, i.e., ROM, RAM, or memory. In accordance with an aspect of the invention, a "computer readable medium" excludes a signal or carrier wave.

In an embodiment of the invention, prior to detecting the change, at least one control table is generated. The control table comprises control entries. Each control entry indicates a control action. In this embodiment determining the at least one control action comprises retrieving the at least one control action associated with the at least one corresponding fault entry from at least one of the control entries.

In an embodiment of the invention, prior to determining the at least one control action, at least one of a location and a cause of the fault indicated by the binary fault code comprised in the at least one corresponding fault entry equaling the at least one changed state entry, is determined.

The invention allows controlling a communications network, communications network resources, communications network services and services provided over the communications network significantly faster than prior art implementations. If, for example, value range classes are assigned four bit binary codes, sixteen separate value range classes are possible. Thus, by using a 64-bit CPU 256 value range classes can be tested in one CPU cycle. Thus, in comparison to the above 1,000-10,000 CPU cycles for calculating one response with prior art, the present invention allows performance gain of 1,000-10,000.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings:

FIG. 3a illustrates a state table of the present invention, and FIG. 3b illustrates a fault table of the present invention.

DETAILED DESCRIPTION OF THE PREFERRED EMBODIMENTS

Reference will now be made in detail to the embodiments of the invention, examples of which are illustrated in the accompanying drawings.

Figure 1:
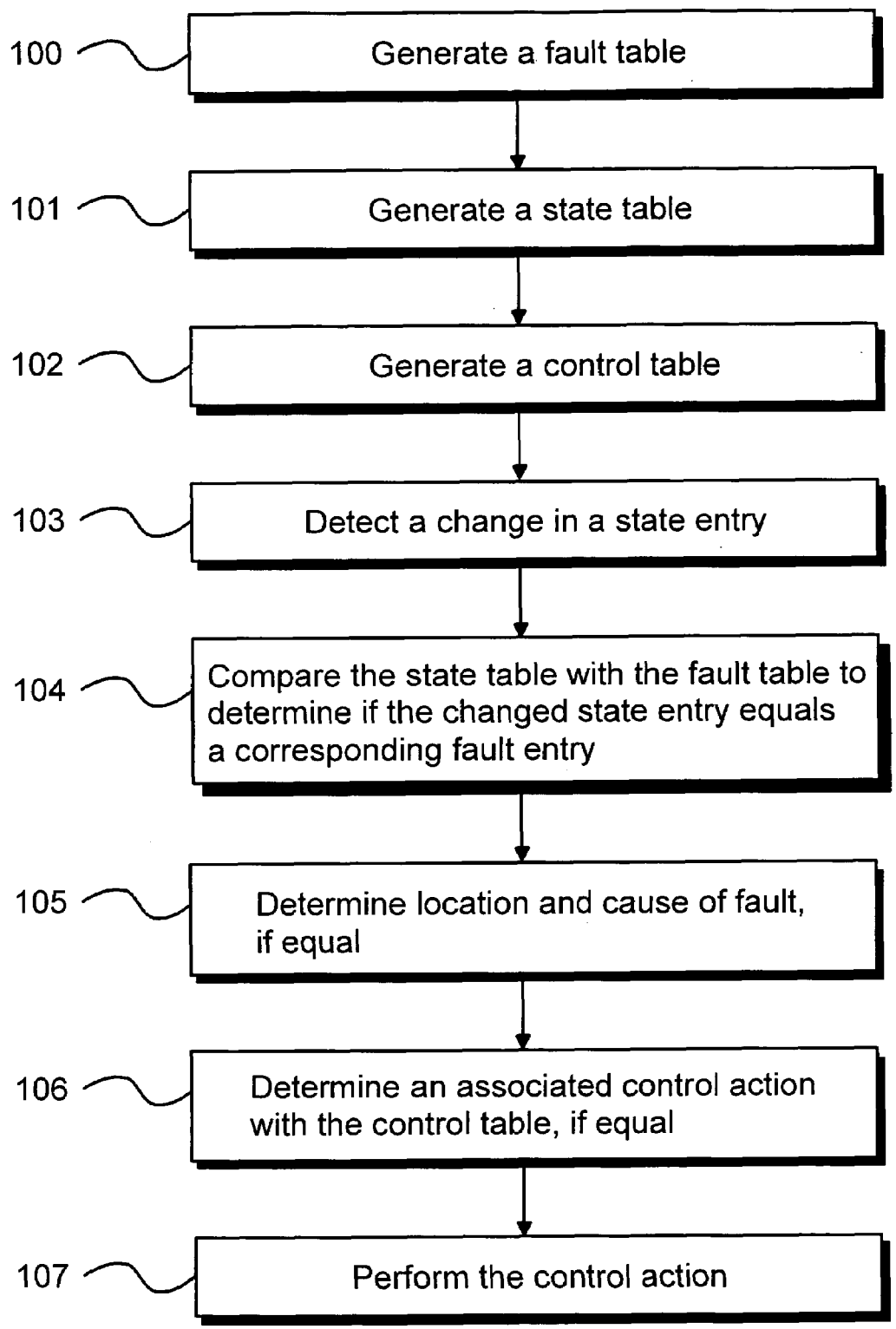
FIG. 1 is a flow diagram illustrating a method according to an embodiment of the present invention.

FIG. 1 illustrates an embodiment of the method of the present invention relating to controlling a communications network. At least one fault table is generated, step 100. The at least one fault table comprises fault entries. Each fault entry comprises a binary fault code. Each binary fault code indicates a fault associated value range class of one of multiple indicators.

Each of the indicators is associated with at least one of the communications network resource, the communications network service, and the service provided over the communications network. At least one of the indicators may be e.g. number of call attempts, number of blocked calls, number of dropped calls, handover failure rates, delay associated with a given connection, and/or throughput associated with a given connection. Furthermore, each of the indicators has a value range. For example, when the indicator is delay, the value range may be e.g. 1 ms-100 ms. The value range of each indicator has been divided into value range classes, and a binary code has been assigned to each value range class.

Continuing the above example of the indicator being delay, the value range of 1 ms-100 ms may be divided into e.g. four value range classes: the first class being e.g. the values 25 ms and below, the second class being the values from 26 ms to 50 ms, the third class being the values from 51 ms to 75 ms, and the fourth class being the values 76 ms and above. Since there are only four classes, two bit binary codes are sufficient for representation of all the classes. The binary code assigned to the first value range class may be e.g. '00', the binary code assigned to the second value range class may be e.g. '01', the binary code assigned to the third value range class may be e.g. '10', and the binary code assigned to the fourth value range class may be e.g. '11'. The value range classes may be of equal size or their sizes may differ.

Continuing the above example of the indicator being delay even further, the fourth value range class (the values 76 ms and above) may be deemed to represent delay values that are too high in view of the performance of the communications network. That is, the fourth value range class may be deemed to represent delay values that indicate a fault in the communications network. Therefore, the binary code '11' assigned to the fourth value range class is a binary fault code in this instance.

At step 101 a state table is generated. The state table comprises state entries. Each state entry comprises a binary state code. Each binary state code indicates a value range class of a piece of collected data related to one of the indicators. That is, data relating to the at least one indicator has been collected. Continuing the above example of the indicator being delay, the collected data may be delay values measured during the last 30 minutes, for example.

In an embodiment, the various indicators are each unique to their respective communications network resource, communications network service, or service provided over the communications network. That is, data relating to a given indicator, e.g. the above delay, has been collected only from one communications network resource, communications network service, or service provided over the communications network. In another embodiment, one or more indicators are common to two or more communications network resources, communications network services, or services provided over the communications network. That is, data relating to a given indicator, e.g. the above delay, has been collected from two or more communications network resources, communications network services, or services provided over the communications network. However, even if the data relating to the given indicator has been collected from the two or more communications network resources, communications network services, or services provided over the communications network, the value ranges of the indicators common to these communications network resources, communications network services, or services provided over the communications network may still be different from each other. That is, an indicator 'delay' associated with a first communications network resource, communications network service, or service provided over the communications network may have a first value range which is different from a second value range of an indicator 'delay' associated with a second communications network resource, communications network service, or service provided over the communications network.

Furthermore, as the pieces of data related to at least one of the indicators have been collected, and each collected piece of the data being within one of the value range classes of the related indicator, each collected piece of the data has been translated into that binary code which is assigned to its associated value range class. To illustrate and continuing the above example, if a given piece of the collected data related to the indicator 'delay' is '13 ms', it has been translated to '00'. Correspondingly, if another piece of the collected data related to the indicator 'delay' is '57 ms', it has been translated to '10', and so on. Herein the binary code assigned to a value range class which a collected piece of data is within, is referred to as a 'binary state code'. Thus each binary state code indicates a value range class of a piece of collected data related to one of the indicators.

Further in the embodiment of the invention illustrated in FIG. 1, at least one control table is generated, step 102. The control table comprises control entries. Each control entry indicates a control action.

At step 103 a change is detected in at least one of the state entries. The state table is compared with the at least one fault table to determine whether the at least one changed state entry equals at least one corresponding fault entry, step 104.

In the embodiment of the invention illustrated in FIG. 1, if the at least one changed state entry equals the at least one corresponding fault entry, at least one of a location and a cause of the fault indicated by the binary fault code comprised in the at least one corresponding fault entry equaling the at least one changed state entry, is determined, step 105.

In an embodiment, a binary tree algorithm may be used at step 105 to determine the at least one of the location and the cause of the fault. The binary tree algorithm may conclude in a branch of options a) no further action is needed, b) final cause of the fault found, and c) follow-up analysis or determination of the at least one of the location and the cause of the fault is required. The follow-up analysis may be launched after the first analysis and it may performed in a manner similar to the first analysis. In other words, there may be multiple subsequent analysis loops until either option a) or b) is reached. Each analysis loop may focus more accurately on the at least one of the location and the cause of the fault, e.g. in another domain (e.g. services or transport) or across domains (e.g. services and transport). Chaining analysis loops in this manner facilitates reducing performance requirements associated with the first analysis loop.

Further in the embodiment of the invention illustrated in FIG. 1, if the at least one changed state entry equals the at least one corresponding fault entry, at least one control action associated with the at least one corresponding fault entry is determined by retrieving the at least one control action from at least one of the control entries, step 106. Finally, at step 107, the determined at least one control action is performed.

Figure 2A:
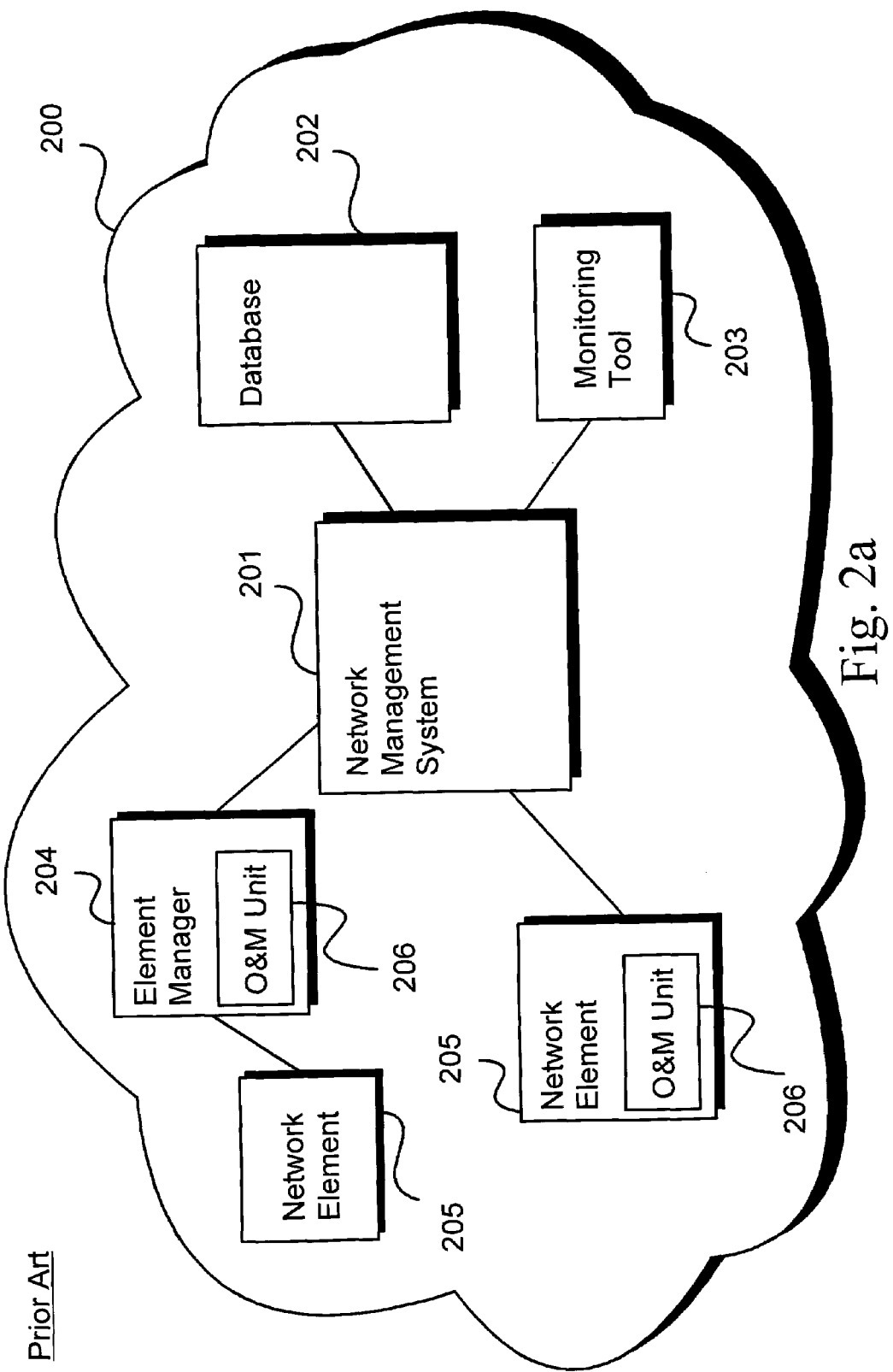
FIG. 2a is a block diagram illustrating components of a prior art communications network.

FIG. 2a illustrates such components of a prior art communications network which are relevant to implementation of the present invention. A communications network 200 is illustrated in FIG. 2a. The communications network 200 may be e.g. a General Packet Radio Service enabled mobile telecommunications network. Generally, however, the communications network 200 in accordance with the present invention may be a wired communications network or a wireless communications network or a combination thereof.

The communications network 200 of FIG. 2a comprises network elements 205 which may be e.g. Base Transceiver Stations, Mobile Services Centers, Serving GPRS Support Nodes, and/or Gateway GPRS Support Nodes. For the sake of clarity only two network elements 205 are illustrated in FIG. 2a. In actual communications networks, however, there may be e.g. thousands of network elements 205, as is known to those skilled in the art.

The communications network 200 of FIG. 2a further comprises a network management system 201. As is known to those skilled in the art, the network management system 201 may be implemented e.g. as a local area network to which various servers implementing the various functions of the network management system 201 and work stations used by network management operators are connected. The network management system 201 may be connected to the various network elements 205 via connections dedicated solely for network management purposes, and/or communications connections of the network 200 may be used to relay network management information also.

The communications network 200 of FIG. 2a further comprises a database 202, a monitoring tool 203, an element manager 204, and Operation and Maintenance units 206. As is illustrated in FIG. 2a, the Operation and Maintenance units 206 may be internal or external to the network elements 205. That is, an Operation and Maintenance unit 206 may be embedded to a network element 205. Alternatively, an Operation and Maintenance unit 206 may be embedded e.g. to the element manager 204 which in turn is connected to one or more network elements 205, as well as to the network management system 201.

Figure 2B:
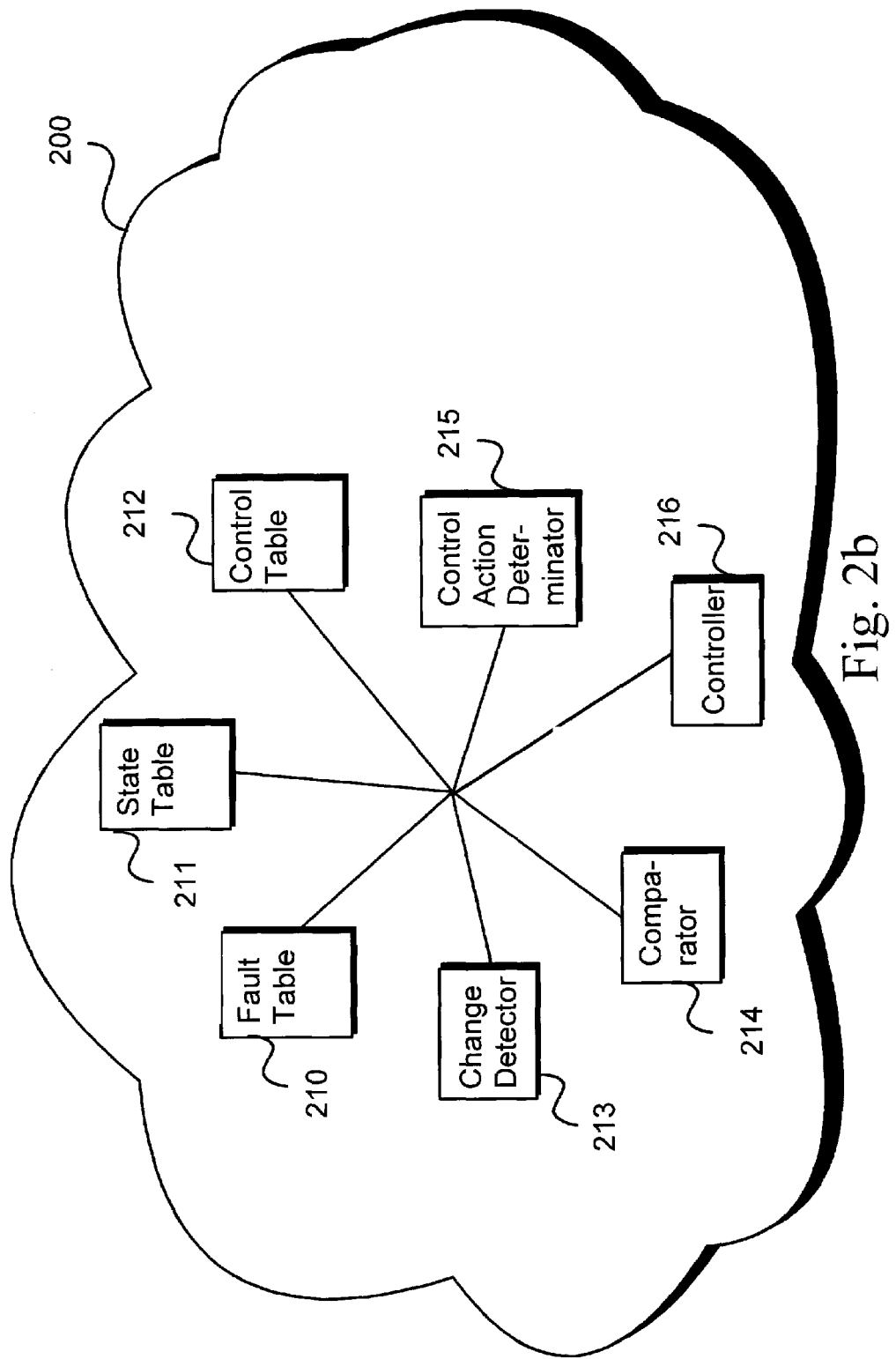
FIG. 2b is a block diagram illustrating a system according to an embodiment of the present invention.

FIG. 2b illustrates an embodiment of the system of the present invention relating to controlling a communications network 200. The system disclosed in FIG. 3 comprises a fault table 210 comprising fault entries. Each fault entry comprises a binary fault code. Each binary fault code indicates a fault associated value range class of one of multiple indicators, each of which indicators is associated with at least one of a resource of the communications network 200, a service of the communications network 200, and a service provided over the communications network 200.

The system disclosed in FIG. 2b further comprises a state table 211 comprising state entries. Each state entry comprises a binary state code. Each binary state code indicates a value range class of a piece of collected data related to one of the indicators. The system disclosed in FIG. 2b further comprises a control table 212 comprising control entries, each control entry indicating a control action.

At least one of the fault table 210 and the state table 211 may be a multidimensional matrix in which each of the dimensions represents a metric or an indicator in a measurement domain (e.g. delay states, dropping states, throughput states) or a functional domain (e.g. radio access network, core network, base station, Serving GPRS Support Node, Gateway GPRS Support Node). Therefore the at least one of the fault table 210 and the state table 211 may be presented and used in a mathematical matrix form. The fault table 210 and the state table 211 may be hierarchical (e.g. domain or device based) to facilitate minimizing the time spent in search algorithms used to compare the fault table 210 with the state table 211, particularly when the search algorithms used are binary tree algorithms.

In an embodiment, the at least one control table 212 may be implemented as configuration or control rule sets at least one of which may be retrieved by a control loop of the control action determinator 215 and sent to one of the network elements 205. The controller 216 in the one of the network elements 205 makes needed adjustments or policy changes every time a new rule set comes. In this embodiment, the one of the network elements 205 may have a rule or policy repository for all possible policy changes so that the new policy or parameterization may be selected locally, thus requiring no configuration traffic between the one of the network elements 205 and the network management system 201, as the case would be in prior art.

The system disclosed in FIG. 2b further comprises a change detector 213 arranged to detect a change in at least one of the state entries. The system disclosed in FIG. 2b further comprises a comparator 214 arranged to compare the state table with the at least one fault table to determine whether the at least one changed state entry equals at least one corresponding fault entry.

The system disclosed in FIG. 2b further comprises a control action determinator 215 arranged to determine at least one control action associated with the at least one corresponding fault entry equaling the at least one changed state entry. In the embodiment of the invention illustrated in FIG. 2b, the control action determinator 215 is further arranged to retrieve the at least one control action from at least one of the control entries of the control table 212. The system disclosed in FIG. 2b further comprises a controller 216 arranged to perform the at least one determined control action.

The change detector 213, comparator 214, control action determinator 215 and controller 216 may be implemented in hardware, in software, or in a combination of hardware and software. Furthermore, the fault table 210, state table 211, control table 212, change detector 213, comparator 214, control action determinator 215 and controller 216 of the embodiment of the system of the invention illustrated in FIG. 2b are implemented in the communications network 200.

Apart from the inclusion of the above inventive elements, the communications network 200 of FIG. 2b may be similar to the communications network 200 illustrated in FIG. 2a, as indicated by the like numbering. In an embodiment, at least one of the fault table 210, state table 211, control table 212, change detector 213, comparator 214, control action determinator 215 and controller 216 may be implemented in the network element 205 of FIG. 2a. In an embodiment, at least one of the fault table 210, state table 211, control table 212, change detector 213, comparator 214, control action determinator 215 and controller 216 may be implemented in the Operation and Maintenance unit 206 (internal or external to the network element 205) of FIG. 2a. In an embodiment, at least one of the fault table 210, state table 211, control table 212, change detector 213, comparator 214, control action determinator 215 and controller 216 may be implemented in the monitoring tool 203 of FIG. 2a. In an embodiment, at least one of the fault table 210, state table 211, control table 212, change detector 213, comparator 214, control action determinator 215 and controller 216 may be implemented in the network management system 201 of FIG. 2a.

In an embodiment of the invention, at least one of the fault table 210, state table 211, control table 212, change detector 213, comparator 214, control action determinator 215 and controller 216 are implemented in the network management system 201 and in at least one of the network elements 205. The comparator 214 and the control action determinator 215 may be comprised in a control action device which may be implemented e.g. in the network management system 201 and in at least one of the network elements 205.

The control system of the present invention may be implemented as a multidimensional state machine. Furthermore, this multidimensional state machine may be implemented as a random access memory (RAM) table or matrix in a computer main memory. Comparison states may be loaded in the initialization phase of the state machine. States of the state machine may be updated, analyzed and tested by multiple control loops with varying loop time and execution priority. For example, monitoring loops may be used to update the state machine, control loops may be used for fast control of the communications network 200 (i.e. real time loops), and management loops may be used for management type actions and analysis of the communications network 200. In such a case the management loops may be less prioritized. Management loops are typically executed in management systems, such as e.g. element manager 204 or network management system 201. Control loops are typically executed in network elements, such as e.g. network element 205.

FIG. 3a illustrates a state table 300 of the present invention, and FIG. 3b illustrates a fault table 310 of the present invention. For the sake of clarity the tables 300 and 310 are simplified examples relating to only three indicators and three network resources. Column 301 of state table 300 comprises state entries associated with a base station. Correspondingly, column 302 of state table 300 comprises state entries associated with a Serving GPRS Support Node. Correspondingly, column 303 of state table 300 comprises state entries associated with a Gateway GPRS Support Node. Row 304 of state table 300 comprises state entries associated with delay. Correspondingly, row 305 of state table 300 comprises state entries associated with number of dropped calls. Correspondingly, row 306 of state table 300 comprises state entries associated with throughput of a connection A.

Thus, to continue the above example of one the indicators being delay, we can see from FIG. 3a that the delay associated with the base station has been between 26 ms to 50 ms while data about the delay associated with the base station was collected, as indicated by the binary state code '01' in the state entry of the delay associated with the base station in state table 300.

Column 311 of fault table 310 comprises fault entries associated with the above base station. Correspondingly, column 312 of fault table 310 comprises fault entries associated with the above Serving GPRS Support Node. Correspondingly, column 313 of fault table 310 comprises fault entries associated with the above Gateway GPRS Support Node. Row 314 of fault table 310 comprises fault entries associated with the above delay. Correspondingly, row 315 of fault table 310 comprises fault entries associated with the above number of dropped calls. Correspondingly, row 316 of fault table 310 comprises fault entries associated with the above throughput of the above connection A.

To continue the above example of one of the indicators being delay once again, we can see from FIG. 3b that delay of 76 ms and above associated with the base station, the Serving GPRS Support Node, and the Gateway GPRS Support Node has e.g. been deemed to be too high in view of the performance of the communications network, thus indicating a fault, as indicated by the binary state code '11' in the fault entries of the delay associated with the base station, the Serving GPRS Support Node, and the Gateway GPRS Support Node in fault table 310.

By comparing corresponding entries, e.g. the delay associated entries of state table 300 with the delay associated entries of fault table 310, it can be seen that the entry of state table 300 associated with the delay and the Serving GPRS Support Node equals the entry of fault table 310 associated with the delay and the Serving GPRS Support Node, that is; they both contain binary code '11'. Therefore, it can be deduced that there is a delay related fault with the Serving GPRS Support Node.

It is obvious to a person skilled in the art that with the advancement of technology, the basic idea of the invention may be implemented in various ways. The invention and its embodiments are thus not limited to the examples described above, instead they may vary within the scope of the claims.

What is claimed is:

1. A method of controlling a communications network, the method comprising:

generating at least one fault table comprising fault entries, each fault entry comprising a binary fault code, each binary fault code indicating a fault associated value range class of one of multiple indicators, each indicator associated with at least one of a communications network resource, a communications network service, and a service provided over a communications network, generating a state table comprising state entries, each state entry comprising a binary state code, each binary state code indicating a value range class of a piece of collected data related to one of said multiple indicators, detecting a change in at least one of said state entries, comparing said state table with said at least one fault table to determine whether said at least one changed state entry equals at least one corresponding fault entry, determining, if said at least one changed state entry equals said at least one corresponding fault entry, at least one control action associated with said at least one corresponding fault entry, and performing said determined at least one control action.

2. The method according to claim 1, further comprising:

generating, prior to said step of detecting said change, at least one control table comprising control entries, each control entry indicating a control action, wherein said step of determining said at least one control action comprises retrieving said at least one control action associated with said at least one corresponding fault entry from at least one of said control entries.

3. The method according to claim 1, further comprising:

determining, prior to said step of determining said at least one control action, at least one of a location and a cause of the fault indicated by said binary fault code comprised in said at least one corresponding fault entry equaling said at least one changed state entry.

4. A system of controlling a communications network, the system comprising:

- at least one fault table comprising fault entries, each fault entry comprising a binary fault code, each binary fault code indicating a fault associated value range class of one of multiple indicators, each indicator associated with at least one of a communications network resource, a communications network service, and a service provided over a communications network,
- a state table comprising state entries, each state entry comprising a binary state code, each binary state code indicating a value range class of a piece of collected data related to one of said multiple indicators,
- a change detector arranged to detect a change in at least one of said state entries,
- a comparator arranged to compare said state table with said at least one fault table to determine whether said at least one changed state entry equals at least one corresponding fault entry,
- a control action determinator arranged to determine at least one control action associated with said at least one corresponding fault entry equaling said at least one changed state entry, and
- a controller arranged to perform the at least one determined control action.

5. The system according to claim 4, further comprising:

- at least one control table comprising control entries, each control entry indicating a control action,
- wherein said control action determinator is further arranged to retrieve said at least one control action associated with said at least one corresponding fault entry from at least one of said control entries.

6. A control action device comprising:

- a comparator arranged to compare a state table with at least one fault table to determine whether at least one changed state entry comprised in said state table equals at least one corresponding fault entry of fault entries comprised in at least one fault table, each state entry comprising a binary state code, each binary state code indicating a value range class of a piece of collected data related to one of multiple indicators, each indicator associated with at least one of a communications network resource, a communications network service, and a service provided over a communications network, and each fault entry comprising a binary fault code, each binary fault code indicating a fault associated value range class of one of said multiple indicators, and
- a control action determinator arranged to determine at least one control action associated with said at least one corresponding fault entry equaling said at least one changed state entry.

7. A computer readable medium embodied with a computer program, for controlling a communications network, the computer program controlling a data-processing device to perform the steps of:

- detecting a change in at least one of state entries comprised in a state table, each state entry comprising a binary state code, each binary state code indicating a value range class of a piece of collected data related to one of multiple indicators, each indicator associated with at least one of a communications network resource, a communications network service, and a service provided over a communications network,
- comparing said state table with at least one fault table to determine whether said at least one changed state entry equals at least one corresponding fault entry of fault entries comprised in at least one fault table, each fault entry comprising a binary fault code, each binary fault code indicating a fault associated value range class of one of said multiple indicators, and
- determining, if said at least one changed state entry equals said at least one corresponding fault entry, at least one control action associated with said at least one corresponding fault entry.

* * * * *